No. 888,676. PATENTED MAY 26, 1908.
G. WEIDINGER.
PLANTER ATTACHMENT.
APPLICATION FILED AUG. 1, 1907.

2 SHEETS—SHEET 1.

WITNESSES
H. Walker
John K. Bradwood

INVENTOR
George Weidinger.
BY Munn & Co.
ATTORNEYS

No. 888,676.
PATENTED MAY 26, 1908.
G. WEIDINGER.
PLANTER ATTACHMENT.
APPLICATION FILED AUG. 1, 1907.
2 SHEETS—SHEET 2.
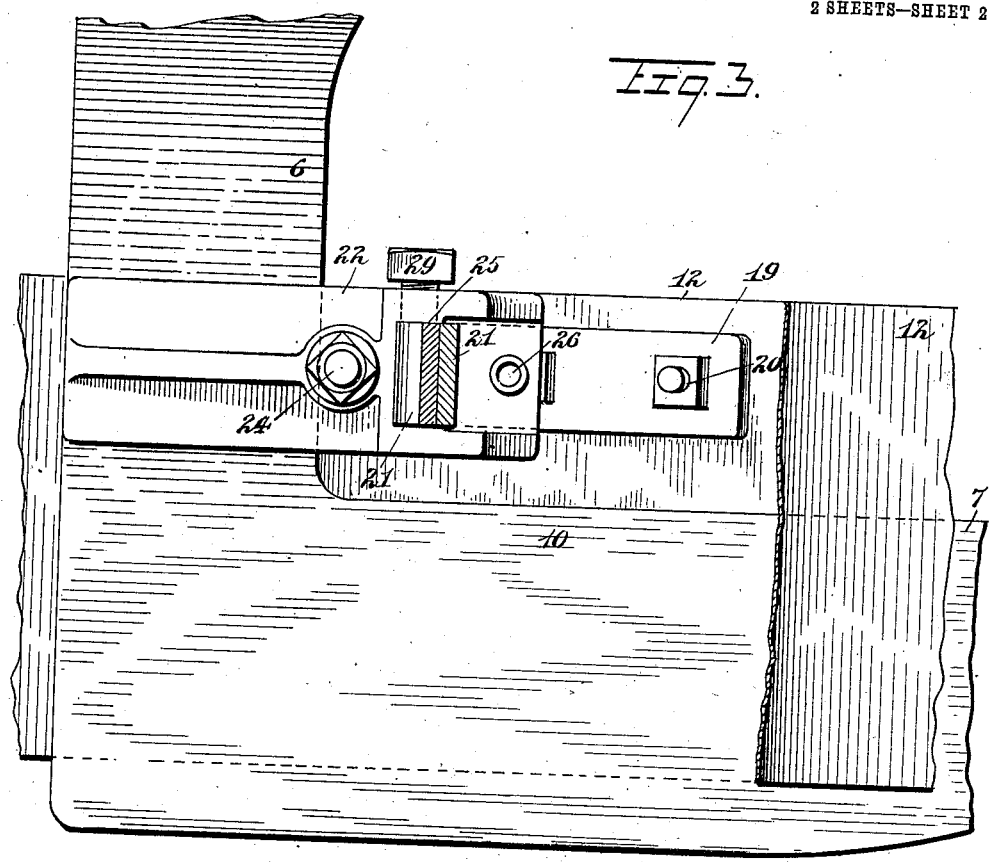
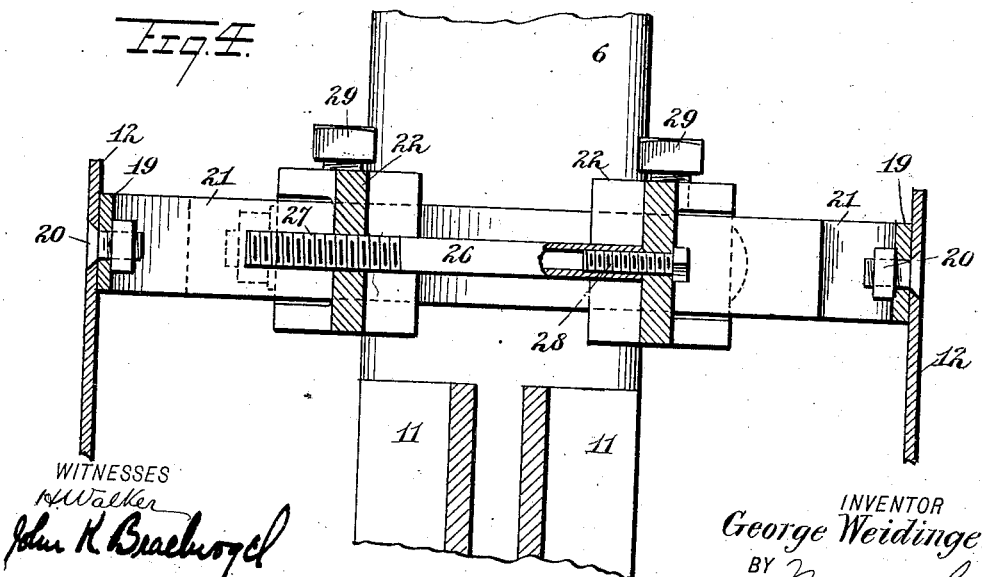
WITNESSES
INVENTOR
George Weidinger.
BY
ATTORNEYS.

UNITED STATES PATENT OFFICE.

GEORGE WEIDINGER, OF CIRCLEVILLE, OHIO.

PLANTER ATTACHMENT.

No. 888,676.  Specification of Letters Patent.  Patented May 26, 1908.

Application filed August 1, 1907. Serial No. 386,590.

*To all whom it may concern:*

Be it known that I, GEORGE WEIDINGER, a citizen of the United States, and a resident of Circleville, in the county of Pickaway and State of Ohio, have invented a new and Improved Planter Attachment, of which the following is a full, clear, and exact description.

This invention relates to planter attachments, and is particularly useful in connection with planters for the sowing of corn, grain and the like in which a runner is provided with lateral blades to run in the furrow.

An object of the invention is to provide a simple, strong and durable planter attachment including the runner and lateral blades, and having means for adjusting the blades in two directions at substantially right angles.

A further object of the invention is to provide a device of this character in which the blades are attached to the runner or furrow opener and to the seed depositing tube, in such a manner that all external projections on the runner and the blades are avoided, whereby these parts can scour clean by contact with the earth when the planter is in operation.

A still further object of the invention is to provide clamping means adapted to be mounted upon the seed depositing tube of a planter, and adjustable longitudinally of the same, and serving to engage the blade-carrying brackets of the planter in a plurality of positions.

The invention consists in the construction and combination of parts to be more fully described hereinafter and particularly set forth in the claims.

Figure 1:
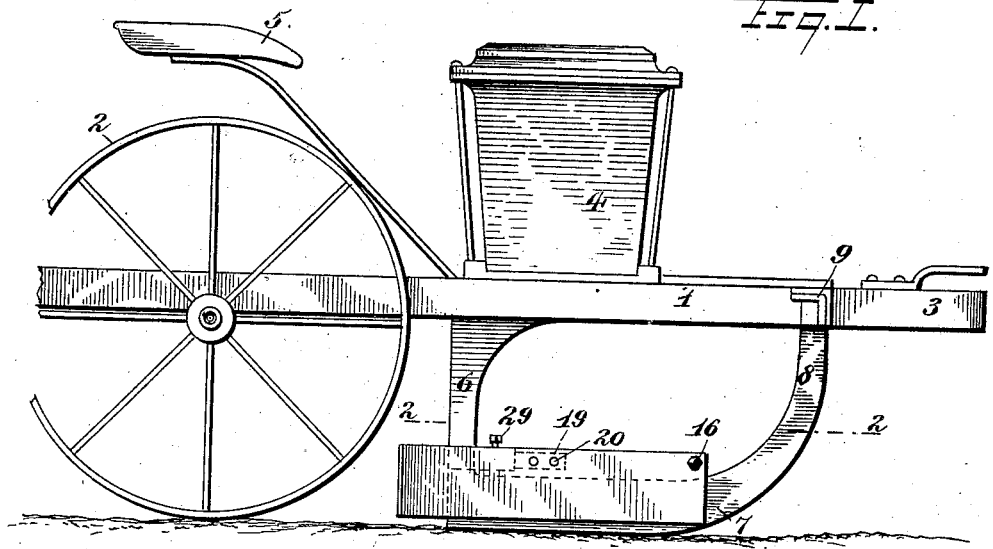
Figure 2:
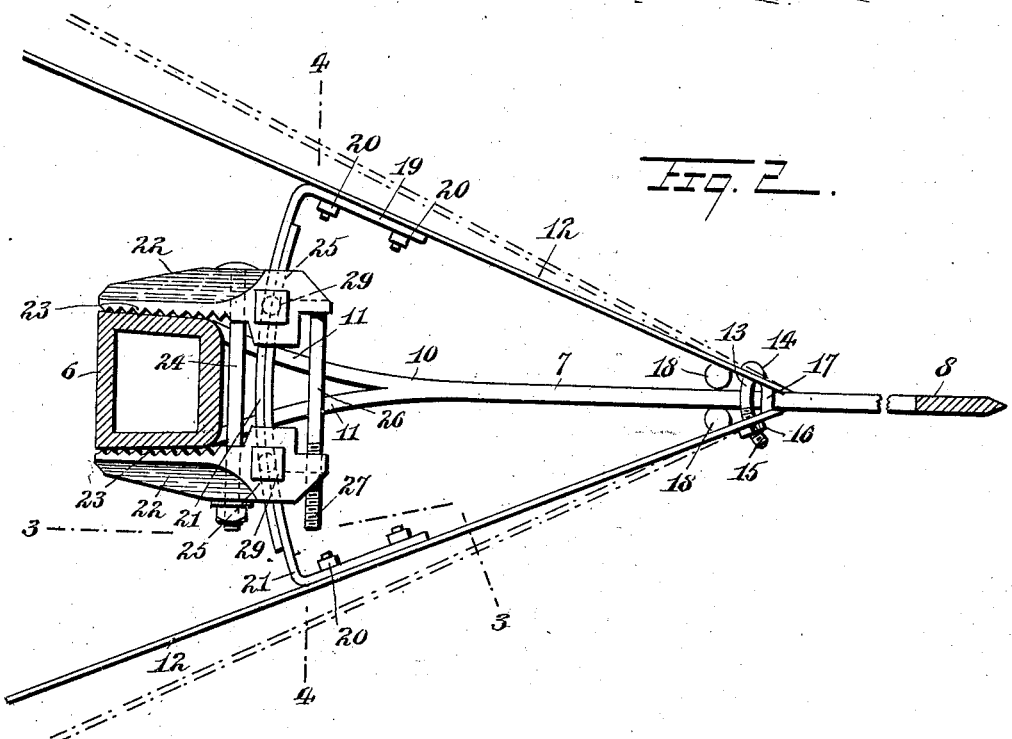

Reference is to be had to the accompanying drawings forming a part of this specification, in which similar characters of reference indicate corresponding parts in all the views, and in which Figure 1 is a side elevation of a part of a planter showing my invention applied thereto; Fig. 2 is a horizontal section on the line 2—2 of Fig. 1; Fig. 3 is a section on the line 3—3 of Fig. 2; and Fig. 4 is a transverse vertical section on the line 4—4 of Fig. 2.

Before proceeding to a more detailed explanation of my invention, it should be clearly understood that the same is applicable to nearly all forms of planters now in use in which a shoe or runner is secured to the frame-work, and is provided with an earth-engaging forward end upwardly disposed and adapted to slide along in a furrow as the planter is moved over the ground in the longitudinal direction of the furrow. The lateral blades which are mounted on each side of the runner are adjustable. This feature is of importance, and permits of the regulation of the depth at which the seed is to be planted and the depth to which it is to be covered with earth. In many devices of this kind in use at present, the operator is often inconvenienced by the accumulation of dirt upon the runner and the blades, which do not scour clean by contact with the earth owing to the projecting bolt heads, studs and the like. To obviate this inconvenience, my device is so arranged that all projections on the outer side of the runner and the blades are avoided. It will be seen from the drawings that the transverse adjustment of the blades is a pivotal one, the blades swinging in a transverse plane about the points of their engagement with the runner. The blades serve to force the earth aside as the device progresses in a furrow, and hold the earth from the seed depositing tube which drops the seeds to be planted. When the planter has passed, the earth which has been displaced by the blades falls back into the furrow and covers the seed which has been deposited therein.

Referring more particularly to the drawings, 1 represents the frame of a corn or other planter of the usual type, mounted upon wheels 2, and having shafts or a pole 3 by means of which one or more draft animals may be attached to the vehicle. The means for attaching the draft animals, and the mechanism for operating the seed depositing device may be of any common or preferred type. It should be understood that my invention resides primarily in the method of attaching the blades to the runner on the seed depositing tube, and in certain features of construction of the parts involved. Upon the frame 1 is carried a seat 5 for the operator, and the conventional hopper 4 which holds the seed and in which are located means (not shown) for permitting the regular depositing of the seed through a seed tube 6 projecting downwardly from the hopper and communicating interiorly therewith. The runner or furrow opener 7 which is located under the framework, has its forward end 8 curved upwardly and securely mounted upon a cross member 9 of the frame. The rear end 10 of the runner is bifurcated as is shown most clearly in Fig. 2, and each of the arms 11 formed by the bifurcation extends toward one side of the seed depositing tube 6 which is arranged at the end 10 of the runner.

The tube 6 may be of any common form, but I preferably employ a tube of substantially rectangular cross section having flat lateral faces, as is shown most clearly in Fig. 2, and for a purpose which will appear hereinafter. The bifurcated end of the runner is secured to the seed depositing tube by welding or in any other suitable manner. The runner forms a depression in the bottom of the furrow as it progresses and the seeds from the hopper fall into this depression, passing through the tube 6. The depression is covered by the earth which falls from the sides of the furrow into the depression after the planter has passed.

Lateral blades 12 are mounted at each side of the runner, and are fastened together at their forward ends by means of a curved bolt pin 13, having a head 14 and a threaded portion 15 upon which is arranged a nut 16. The pin is mounted in suitable openings of the blades above the upper edge of the runner. The curvature of the pin is such that each end is substantially normal with the surface of a blade. One of the blades 12 carries a stud 17, extending laterally toward the other blade to space them apart a distance substantially equal to the thickness of the runner. The stud is arranged at the side of the pin 13 remote from the runner, so that as the blades are approached by tightening the bolt pin the lower forward portions of the blades will be drawn tightly together and clamped in position upon the runner, the stud acting as a fulcrum. Near the forward ends, at the inner faces, the blades have rounded projections 18, adapted to engage the sides of the runner and to assist in holding the blades firmly in position upon the runner.

The blades 12 at the inner faces carry brackets 19, mounted in position upon the blades by means of bolts 20, and having inwardly disposed arms 21. The arms 21, which are normally in mutual engagement, are curved in the arc of a circle having a radius substantially equal to the distance between each arm and the point of engagement of the blade carrying that arm, with the runner. It will be understood that, as the blades are swung inwardly or outwardly about their points of engagement with the runner as pivotal points, the arms 21 continue in engagement, as they move or slide adjacent to one another. This is owing to the curvature of the arms. Clamp members 22 having inner serrated faces 23, are mounted at opposite sides of the seed depositing tube, and are held together by means of a bolt 24 passing through suitable openings of the clamp members. The clamp members have transverse openings 25 in which are arranged the arms 21 of the blade-carrying brackets. The clamp members project forwardly beyond the seed depositing tube, and are spaced by a spacing member 26 having a threaded extremity 27 mounted in a suitably threaded opening of one of the clamp members and engaging at the other end with the opposite clamp member. This end of the spacing member, which is hollow, is threaded and is engaged interiorly by a threaded stud 28 which is mounted in a suitable opening of the adjacent clamp member. It will be understood that by turning the spacing member in one direction or the other the outer ends of the clamp members are approached or moved apart. At the same time, by tightening the clamp bolt 24 the members can be securely locked in position upon the seed depositing tube, the clamp members being drawn inwardly against the tube with the spacing member acting as a fulcrum. I provide set screws 29 carried by each of the clamp members and serving to jam the arms 21 in position at each of the clamp members. It will be seen that each of the set screws locks both arms at each of the respective clamp members, as the set screws engage the arms at a point of their mutual engagement with the opening of each clamp member.

Having thus described my invention I claim as new and desire to secure by Letters Patent:

1. In a planter attachment, the combination, with a seed depositing tube, a runner, and lateral blades at each side of said runner, of clamp members having adjustable means for removably securing them upon the seed depositing tube, brackets carrying the blades and normally engaging therebetween, and means for removably securing said brackets to one of said clamp members at a point of the mutual engagement of said brackets.

2. In a planter attachment, clamp members adapted to be adjustably mounted upon a seed depositing tube, blade-carrying brackets having parts disposed toward each other and normally in engagement, and means for adjustably securing said parts of said brackets to one of said clamp members at a point of the mutual engagement of said parts.

3. In a planter attachment, clamp members adapted to be adjustably mounted upon a seed depositing tube, blade-carrying brackets having arms disposed toward each other and normally in engagement, and means for simultaneously and adjustably securing said arms of said brackets to one of said clamp members at a point of the mutual engagement of said arms.

4. In a planter attachment, clamp members adapted to be adjustably mounted upon a seed depositing tube and presenting transverse openings, blade-carrying brackets having arms disposed toward each other and arranged to slide adjacent one another, said arms being adapted to be arranged in said openings of said clamp members, and means for simultaneously and adjustably securing said arms in said openings of said clamp members.

5. In a planter attachment, clamp members adapted to be adjustably mounted upon a seed depositing tube, blades adapted to be mounted upon a runner and adjustable transversely thereof, means for clamping said blades upon the runner, brackets mounted upon said blades and having arms disposed toward each other and normally in engagement, said arms being curved in the arc of a circle, and means for simultaneously and adjustably securing said arms to one of said clamp members at a point of the mutual engagement of said arms.

6. In a planter attachment, clamp members adapted to be adjustably mounted upon a seed depositing tube and having means for approaching said clamp members to hold the same in position, blades adapted to be mounted upon a runner and adjustable transversely thereof, means for clamping said blades upon the runner near the forward ends of the blades, brackets mounted at the inner sides of said blades and having arms disposed toward each other and normally in engagement, said arms being curved in the arc of a circle, said clamp members having openings adapted to receive said arms, and means for simultaneously and adjustably securing said arms in said openings.

7. In a planter attachment, clamp members having serrated faces, a bolt joining said clamp members and adapted to approach the same to clamp said members upon a seed depositing tube, a separating member interposed between said clamp members at the side of said bolt remote from the seed depositing tube, said clamp members presenting openings, blades adapted to be adjustably mounted upon a runner and movable transversely thereof, brackets mounted at the inner faces of said blades and having inwardly disposed arms, said arms being curved in the arc of a circle having a radius equal to the distance of one arm from the point of engagement of the respective blade with the runner, said openings of said clamp members being adapted to receive said arms, and set-screws carried by said clamp members and serving to secure said arms in said openings.

8. In a planter attachment, blades adapted to be mounted at the sides of a runner and having a curved bolt connecting said blades and adapted to approach the same at the forward ends thereof, one of said blades having a stud engaging the other of said blades to separate the same at the side of said bolt remote from said runner, said blades having rounded projections at the inner faces thereof for engaging the runner, and means for adjustably securing said blades to a seed depositing tube.

In testimony whereof I have signed my name to this specification in the presence of two subscribing witnesses.

GEORGE WEIDINGER.

Witnesses:
   FERTUS WALTERS,
   CHRIS A. WELDON.